(12) United States Patent
Lin

(10) Patent No.: US 7,826,453 B2
(45) Date of Patent: Nov. 2, 2010

(54) SET TOP BOX ADDRESS DETECTION SYSTEM AND METHOD THEREOF

(75) Inventor: Han-Tzung Lin, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 632 days.

(21) Appl. No.: 11/617,761

(22) Filed: Dec. 29, 2006

(65) Prior Publication Data

US 2008/0056266 A1 Mar. 6, 2008

(30) Foreign Application Priority Data

Sep. 1, 2006 (CN) .......................... 2006 1 0062430

(51) Int. Cl.
*H04L 12/28* (2006.01)
*H04L 12/56* (2006.01)
(52) U.S. Cl. ..................... 370/392; 370/216; 370/248; 370/254
(58) Field of Classification Search ................. 370/392; 725/25; 726/4; 709/245, 250, 203, 208, 709/209, 222, 221, 211
See application file for complete search history.

(56) References Cited

U.S. PATENT DOCUMENTS

| | | | | |
|---|---|---|---|---|
| 5,708,654 A | * | 1/1998 | Arndt et al. ................. | 370/242 |
| 6,195,689 B1 | * | 2/2001 | Bahlmann .................... | 709/217 |
| 6,223,222 B1 | * | 4/2001 | Fijolek et al. ............... | 709/227 |
| 6,651,092 B1 | * | 11/2003 | Muraoka ..................... | 709/220 |
| 6,697,862 B1 | | 2/2004 | Beser et al. | |
| 6,859,826 B2 | | 2/2005 | Bahlmann | |
| 2004/0073953 A1 | * | 4/2004 | Xu et al. ..................... | 725/146 |
| 2004/0123329 A1 | * | 6/2004 | Williams et al. ............ | 725/111 |
| 2005/0114880 A1 | * | 5/2005 | Gould ......................... | 725/25 |
| 2008/0040573 A1 | * | 2/2008 | Malloy et al. ............... | 711/202 |

FOREIGN PATENT DOCUMENTS

CN 1614942 A 5/2005

* cited by examiner

*Primary Examiner*—Daniel Wu
*Assistant Examiner*—Frederick Ott
(74) *Attorney, Agent, or Firm*—Wei Te Chung

(57) ABSTRACT

An address detection system for detecting an address of a set top box is provided; the address detection system includes a first server and a second server. The first server includes a first parsing module and a storage module. The first parsing module parses a first request packet from the set top box, to obtain a media access control (MAC) address and a virtual Internet protocol address (IP) of the set top box. The storage module has a mapping table for storing the MAC address and the virtual IP address therein. The second server includes a second parsing module and an authenticating module. The second parsing module parses a second request packet from the set top box, to acquire the MAC address of the set top box. The authenticating module checks the mapping table for the virtual IP address corresponding to the MAC address, to authenticate validity of the virtual IP address. An address detection method is also provided.

18 Claims, 5 Drawing Sheets

SET TOP BOX ADDRESS DETECTION SYSTEM AND METHOD THEREOF

BACKGROUND OF THE INVENTION

1. Field of the Invention

The invention generally relates to an address detection system and method thereof, and particularly to a set top box address detection system and method thereof.

2. Description of Related Art

During production of a set top box (STB), a kernel has to be downloaded from a remote trivial file transfer protocol (TFTP) server to the STB, and some root system files have to be to mounted from a network file system (NFS) to the STB before the STB is started. The TFTP server transmits the kernel to the STB according to a virtual Internet protocol (IP) address preset during production of the STB. Prior to receiving the root system files, the STB first requests a remote dynamic host configuration protocol (DHCP) server to allocate an authentic IP address, and then the NFS transmits the root system files according to the authentic IP address.

However, in a typical product line composed of a plurality of STBs, virtual IP addresses of some of the STBs may inevitably be the same as authentic IP addresses of other STBs allocated by the DHCP server, thus, an address conflict occurs, and some of the STBs may malfunction without correctly receiving the root system files.

Therefore, a heretofore unaddressed need exists in the industry to overcome the aforementioned deficiencies and inadequacies.

SUMMARY OF THE INVENTION

An address detection system for detecting an address of a set top box is provided, the address detection system includes a first server and a second server. The first server includes a first parsing module and a storage module. The first parsing module parses a first request packet from the set top box, to obtain a media access control (MAC) address and an IP address of the set top box. The storage module has a mapping table for storing the MAC address and the virtual IP address therein. The second server includes a second parsing module and an authenticating module. The second parsing module parses a second request packet from the set top box, to acquire the MAC address of the set top box. The authenticating module checks the mapping table for the virtual IP address corresponding to the MAC address, to authenticate validity of the virtual IP address.

An address detection method for detecting an address of a set top box, comprising: providing a first server and a second server, the first server comprising a first parsing module and a storage module, and the second server comprising a second parsing module and an authenticating module; parsing a first request packet from the set top box by the first parsing module, to acquire a MAC address and a virtual IP address of the set top box; storing the MAC address and the virtual IP address in a mapping table; parsing the second request packet, to obtain the MAC address of the set top box; checking the mapping table for the virtual IP address of the set top box according to the MAC address thereof, to authenticate validity of the virtual IP address; and allocating the virtual IP address as an authentic IP address to the set top box if the virtual IP address is valid.

Other advantages and novel features will become more apparent from the following detailed description when taken in conjunction with the accompanying drawings, in which:

DETAILED DESCRIPTION OF THE INVENTION

Figure 1:
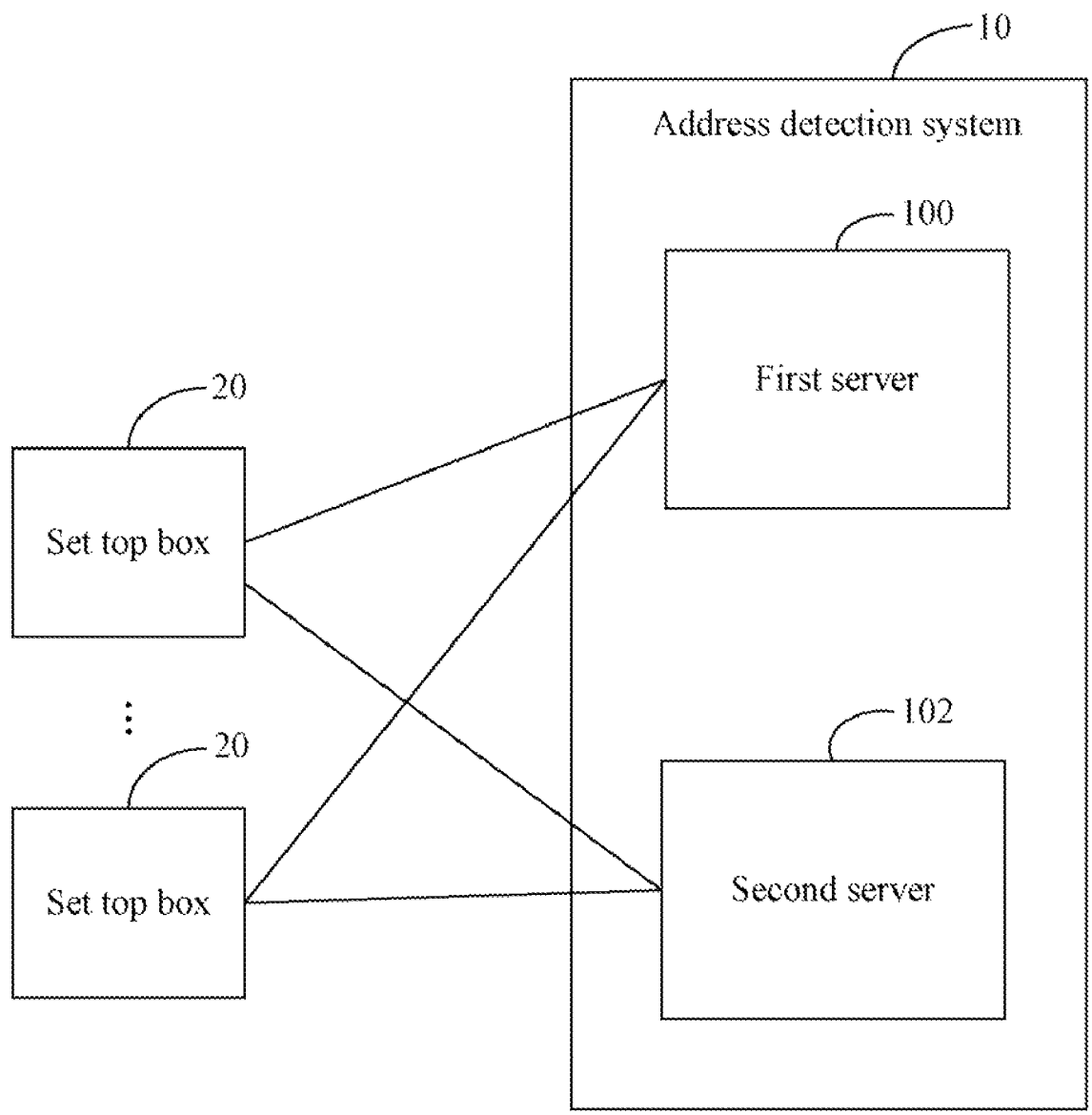
FIG. 1 is a schematic diagram of an address detection system of an exemplary embodiment of the invention.

FIG. 1 is a schematic diagram of an address detection system 10 of an exemplary embodiment of the invention.

The address detection system 10 detects addresses of a plurality of set top boxes 20, and includes a first server 100 and a second server 102. In this embodiment, the first server 100 is a trivial file transfer protocol (TFTP) server, the second server 102 is a dynamic host configuration protocol (DHCP) server, and addresses of the set top box 20 include a media access control (MAC) address and a virtual Internet protocol (IP) address thereof.

Figure 2:
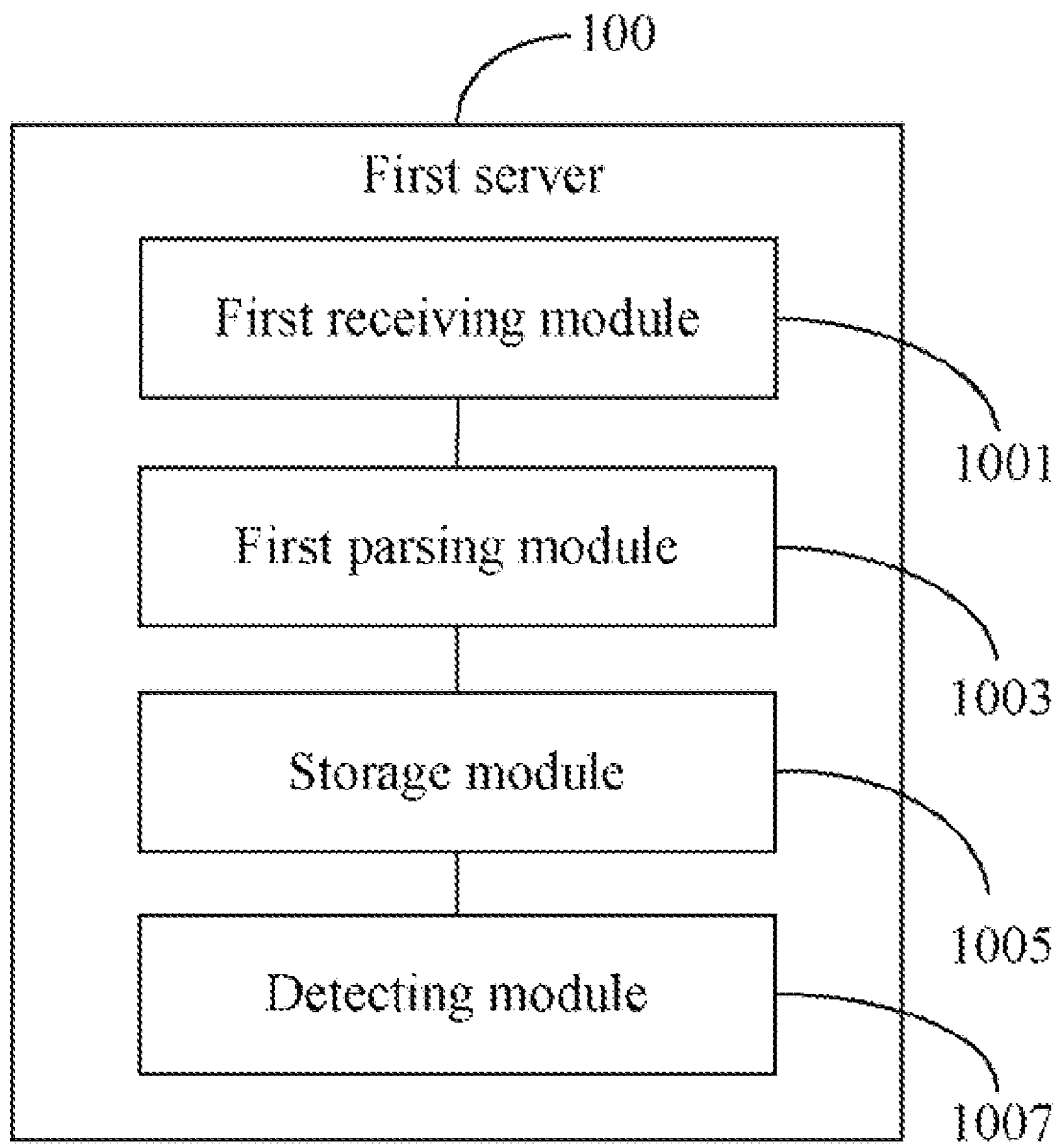
FIG. 2 is a block diagram of a first server.

FIG. 2 is a block diagram of the first sever 100.

The first server 100 includes a first receiving module 1001, a first parsing module 1003, a storage module 1005 and a detecting module 1007.

The first receiving module 1001 receives a first request packet from the set top box 20. In this embodiment, the first request packet is a DHCP request packet.

The first parsing module 1003 parses the first request packet, to obtain the MAC address and the virtual IP address of the set top box 20. In this embodiment, the virtual IP address is preset during manufacture of the set top box 20, and is unique to the MAC address thereof.

The storage module 1005 has a mapping table for storing the MAC address and the virtual IP address of the set top box 20 therein. As can be seen from the mapping table "Table 1" below, a virtual IP address of 168.84.59.1 is unique to a MAC address of 5E-AB-BF-68-EC-4A, a virtual IP address of 168.84.59.2 is unique to a MAC address of 5E-AB-BF-68-EC-4B, and so on.

TABLE 1

| Virtual IP address | MAC address |
|---|---|
| 168.84.59.1 | 5E-AB-BF-68-EC-4A |
| 168.84.59.2 | 5E-AB-BF-68-EC-4B |
| 168.84.59.3 | 5E-AB-BF-68-EC-4C |
| . . . | . . . |

The storage module 1005 further stores a core file of the set top box 20. In this embodiment, the core file is kernel software.

The detecting module 1007 detects whether there are two different MAC addresses corresponding to a same virtual IP address.

The detecting module 1007 further generates an alarm message if there are two different MAC addresses corresponding to a same virtual IP address, and deletes a redundant MAC address from the mapping table.

Figure 3:
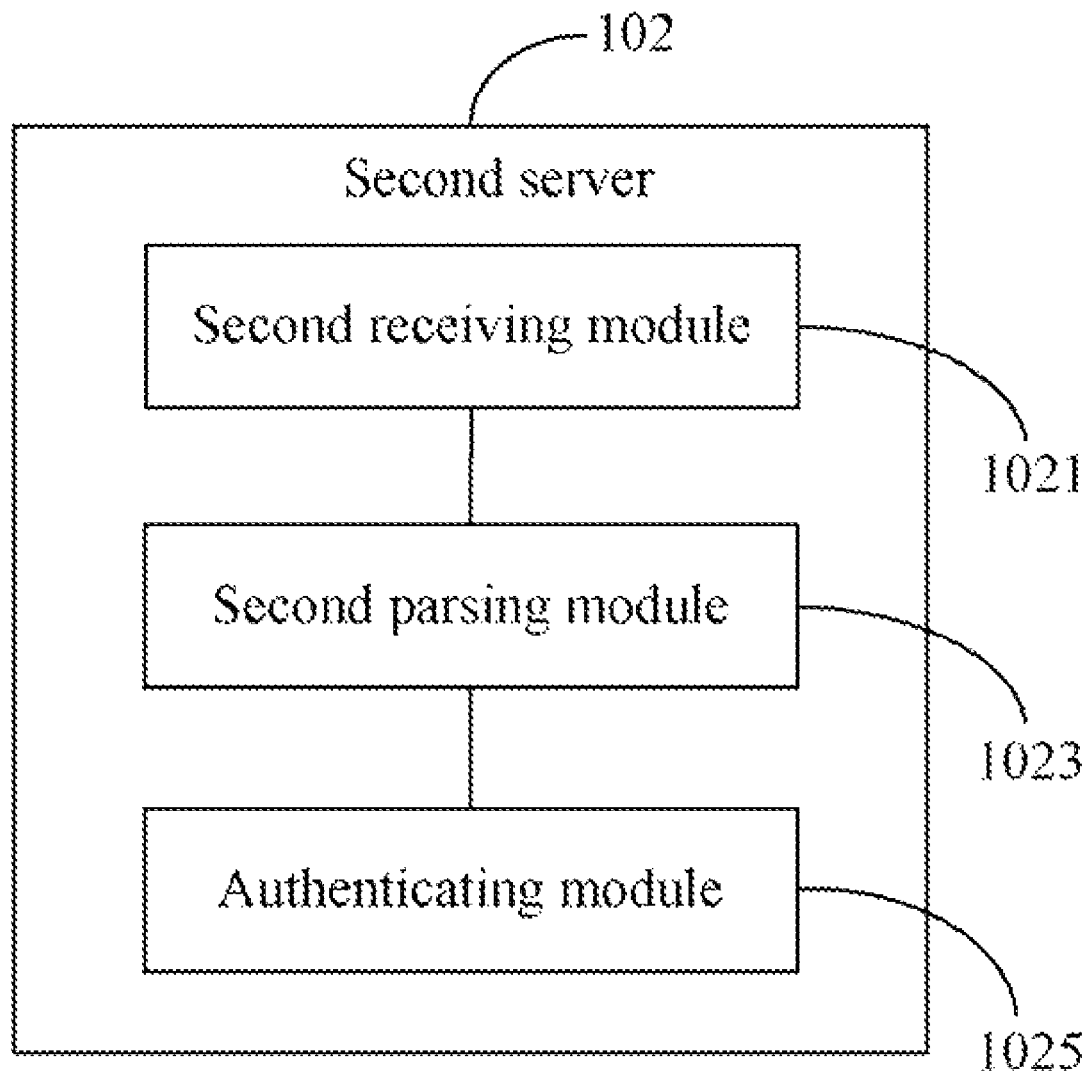
FIG. 3 is a block diagram of a second server.

FIG. 3 is a block diagram of the second server 102.

The second server 102 includes a second receiving module 1021, a second parsing module 1023 and an authenticating module 1025.

The second receiving module 1021 receives a second request packet from the set top box 20. In this embodiment, the second request packet is a TFTP request packet.

The second parsing module 1023 parses the second request packet, to obtain the MAC address of the set top box 20.

The authenticating module 1025 checks the mapping table for the virtual IP address corresponding to the MAC address, to authenticate validity of the virtual IP address, and allocates the virtual IP address as an authentic IP address to the set top box 20 if the virtual IP address is valid.

In detail, the authenticating module 1025 first checks the mapping table for the virtual IP address of the set top box 20 according to the MAC address thereof, and determines whether the virtual IP address is already listed in the mapping table. If the virtual IP address of the set top box 20 is not listed in the mapping table, the authenticating module 1025 generates an alarm message, otherwise the authenticating module 1025 checks to determine whether there are two IP addresses corresponding to the MAC address. If there are two IP addresses corresponding to the MAC address, the authenticating module 1025 generates an alarm message, otherwise the authenticating module 1025 allocates the virtual IP address as an authentic IP address to the set top box 20.

Figure 4:
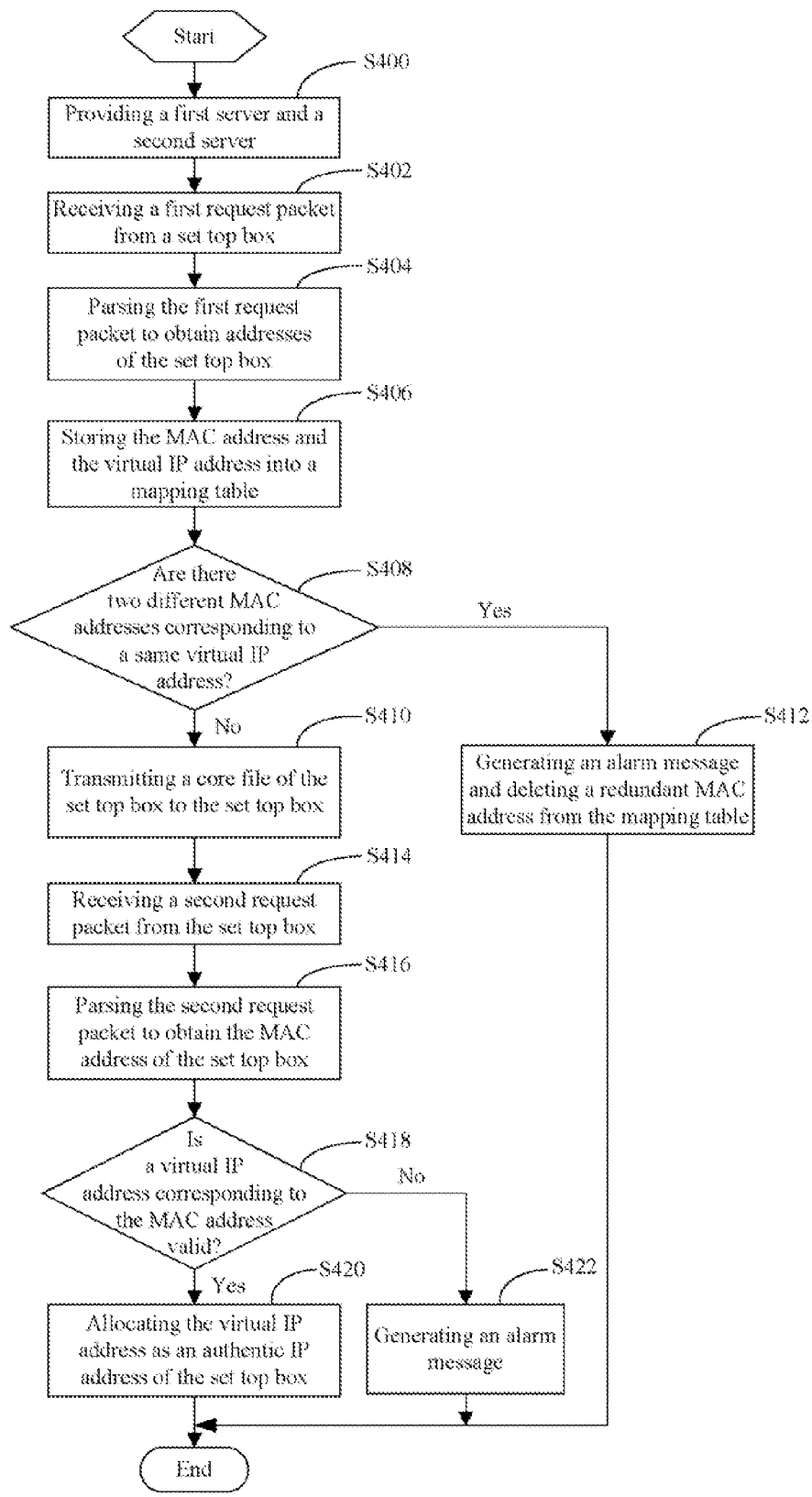
FIG. 4 is a flowchart of an address detection method of another embodiment of the invention.

FIG. 4 is a flowchart of an address detection method of another embodiment of the invention.

In step S400, a first server 100 and a second server 102 are provided. The first server 100 includes a first receiving module 1001, a first parsing module 1003, a storage module 1005 and a detecting module 1007. The second server 102 includes a second receiving module 1021, a second parsing module 1023 and an authenticating module 1025. In this embodiment, the first server 100 is a trivial file transfer protocol (TFTP) server, and the second server 102 is a dynamic host configuration protocol (DHCP) server.

In step S402, the first receiving module 1001 receives a first request packet from a set top box 20. In this embodiment, the first request packet is a TFTP request packet.

In step S404, the first parsing module 1003 parses the first request packet, to obtain addresses of the set top box 20. In this embodiment, the addresses include a media access control (MAC) address and a virtual Internet protocol (IP) address.

In step S406, the storage module 1005 stores the MAC address and the virtual IP address in a mapping table therein.

In step S408, the detecting module 1007 checks the mapping table, to detect whether there are two different MAC addresses corresponding to a same virtual IP address. If there are two different MAC addresses corresponding to a same virtual IP address, the process proceeds to step S412, otherwise the process proceeds to step S410.

In step S410, the detecting module 1007 transmits a core file for the set top box 20 to the set top box 20.

In step S412, the detecting module 1007 generates an alarm message, and deletes a redundant MAC address from the mapping table.

In step S414, the second receiving module 1021 receives a second request packet from the set top box. In this embodiment, the second request packet is a DHCP request packet.

In step S416, the second parsing module 1023 parses the second request packet, to obtain the MAC address of the set top box 20.

In step S418, the authenticating module 1025 checks the mapping table for the virtual IP address corresponding to the MAC address, to authenticate validity of the virtual IP address. If the virtual IP address is valid, the process proceeds to step S420, otherwise the process proceeds to step S422.

In step S420, the authenticating module 1025 allocates the virtual IP address as an authentic IP address of the set top box 20.

In step S422, the authenticating module 1025 generates an alarm message.

Figure 5:
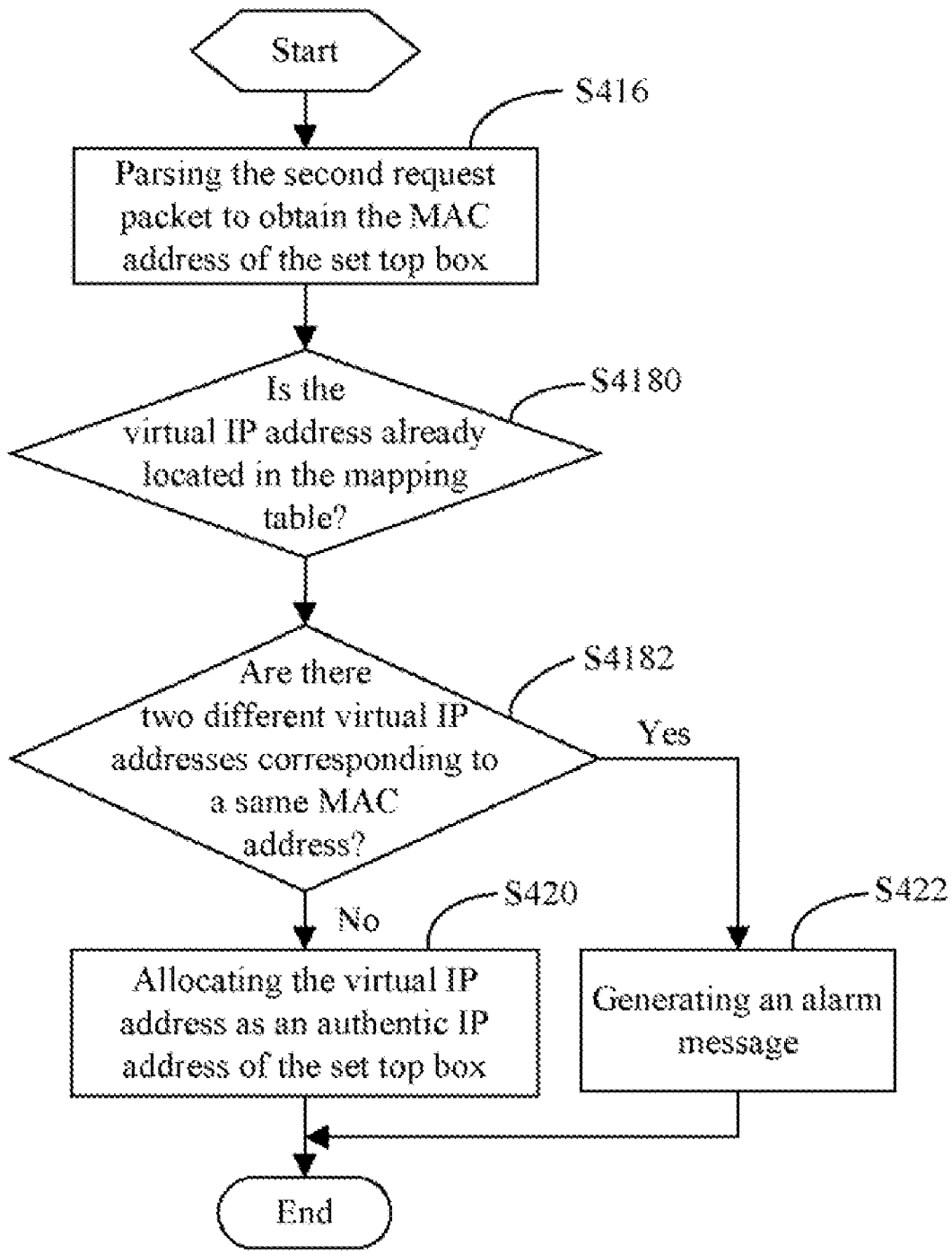
FIG. 5 is a detailed flowchart of step S418 in FIG. 4.

FIG. 5 is a detailed flowchart of step S418.

In step S4180, the authenticating module 1025 checks the mapping table, to determine whether the virtual IP address is already located therein. IF the virtual IP address is not located in the mapping table, the process proceeds to step S4182, otherwise the process proceeds to step S422.

In step S4182, the authenticating module 1025 checks the mapping table, to determine whether there are two IP addresses corresponding to the same MAC address. If there are two IP addresses corresponding to the same MAC address, the process proceeds to step S422, otherwise the process proceeds to step S420.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments.

What is claimed is:

1. An address detection system for detecting an address of a set top box, comprising:
   a first server, comprising:
      a first parsing module for parsing a first request packet from the set top box, to obtain a media access control (MAC) address and a virtual Internet protocol (IP) address of the set top box; and
      a storage module having a mapping table, for storing the MAC address and the virtual IP address therein; and
   a second server, comprising:
      a second parsing module for parsing a second request packet from the set top box, to acquire the MAC address of the set top box; and
      an authenticating module for checking the mapping table for the virtual IP address corresponding to the MAC address, to authenticate validity of the virtual IP address.

2. The address detection system in accordance with claim 1, wherein the authenticating module is further for allocating the virtual IP address as an authentic IP address of the set top box if the virtual IP address is valid.

3. The address detection system in accordance with claim 1, wherein the first server further comprises a detecting module for checking the mapping table, to determine whether there are two different MAC addresses corresponding to a same virtual IP address.

4. The address detection system in accordance with claim 3, wherein the detecting module is further for generating an alarm message and deleting a redundant MAC address from the mapping table if there are the two different MAC addresses corresponding to a same virtual IP address.

5. The address detection system in accordance with claim 1, wherein the storage module is further for storing kernel software of the set top box.

6. The address detection system in accordance with claim 1, wherein the first server further comprises a first receiving module for receiving the first request packet from the set top box.

7. The address detection system in accordance with claim 6, wherein the first server is a trivial file transfer protocol server.

8. The address detection system in accordance with claim 7, wherein the first request packet is a trivial file transfer protocol packet.

9. The address detection system in accordance with claim 1, wherein the second server further comprises a second receiving module for receiving the second request packet from the set top box.

10. The address detection system in accordance with claim 9, wherein the second server is a dynamic host configuration protocol server.

11. The address detection system in accordance with claim 10, wherein the second request packet is a dynamic host configuration protocol packet.

12. An address detection method for detecting an address of a set top box, comprising:
- providing a first server and a second server, the first server comprising a first parsing module and a storage module, and the second server comprising a second parsing module and an authenticating module;
- parsing a first request packet from the set top box by the first parsing module, to acquire a media access control (MAC) address and a virtual Internet protocol (IP) address of the set top box;
- storing the MAC address and the virtual IP address in a mapping table;
- parsing a second request packet, to obtain the MAC address of the set top box;
- checking the mapping table for the virtual IP address of the set top box according to the MAC address thereof, to authenticate validity of the virtual IP address; and
- allocating the virtual IP address as an authentic IP address of the set top box if the virtual IP address is valid.

13. The address detection method in accordance with claim 12, further comprising generating an alarm message if the virtual IP address is invalid.

14. The address detection method in accordance with claim 12, wherein the step of checking the mapping table for the virtual IP address of the set top box according to the MAC address thereof, to authenticate validity of the virtual IP address comprises checking the mapping table, to determine whether the virtual IP address is already located therein.

15. The address detection method in accordance with claim 14, wherein the step of checking the mapping table for the virtual IP address of the set top box according to the MAC address thereof, to authenticate validity of the virtual IP address further comprises generating an alarm message if the virtual IP address is already in the mapping table.

16. The address detection method in accordance with claim 15, wherein the step of checking the mapping table for the virtual IP address of the set top box according to the MAC address thereof, to authenticate validity of the virtual IP address further comprises checking the mapping table, to determine whether there are two IP addresses corresponding to the MAC address.

17. The address detection method in according with claim 16, wherein the step of checking the mapping table for the virtual IP address of the set top box according to the MAC address thereof, to authenticate validity of the virtual IP address further comprises generating the alarm message if there are the two IP address corresponding to the MAC address.

18. The address detection method in according with claim 12, further comprising:
- providing a detecting module in the first server;
- checking the mapping table by the detecting module, to determine whether there are two different MAC addresses corresponding to a same virtual IP address; and
- transmitting kernel software of the set top box to the set top box if there are not two different MAC addresses corresponding to the same virtual IP address.

* * * * *